United States Patent Office 3,377,400
Patented Apr. 9, 1968

3,377,400
ISOMERIZATION AND DISPROPORTIONATION
OF ALKYL AROMATICS
John J. Wise, Arlington, Mass., assignor to Mobil Oil
Corporation, a corporation of New York
No Drawing. Continuation of application Ser. No.
313,450, Oct. 3, 1963. This application Mar. 27,
1967, Ser. No. 626,339
10 Claims. (Cl. 260—668)

ABSTRACT OF THE DISCLOSURE

Alkyl aromatic hydrocarbons are subjected to isomerization or disproportionation at high efficiency by contact with a crystalline aluminosilicate catalyst, in liquid phase, at a temperature below about 600° F.

Cross reference to related application

This application is a continuation of application Ser. No. 313,450, filed Oct. 3, 1963, and abandoned on Mar. 27, 1967.

The invention relates to improvements in catalytic reactions of hydrocarbons. More particularly the invention is concerned with catalytic reactions conducted in the presence of highly active catalysts whereby the formation of deactivating deposits on the catalysts is reduced.

The process of this invention overcomes the disadvantages of the prior art in conducting catalytic reactions at highly satisfactory conversion rates with substantially no sacrifice in product selectivity and which offers high conversion rates with minimum deposits of deleterious material on the catalysts. The present invention yields catalytic reactions that cannot take place with the conventional catalysts and, further, these processes permit easy separation of the catalysts from the charge and products.

The process of this invention comprises conducting chemical reactions over superactive catalysts which are alumino-silicates of ordered internal structure having a cracking activity in terms of alpha rating greater than 2.5 under conditions which tend to the formation of contaminating deposits and wherein a material having solvent power for these deposits is present which material is in the liquid phase at the conditions of reaction. The significance of the term alpha rating will be explained hereinafter.

The catalytic materials used in this invention are aluminosilicates, of either natural or synthetic origin having an ordered internal structure. These materials are possessed of very high surface per gram and are microporous. The ordered structure gives rise to a definite pore size, related to the structural nature of the ordered internal structure. Several forms are commercially available. A 5A material indicates a material of A structure and a pore size of about 5 A. diameter. A 13X material is one of X faujasite structure and 10–13 A. pore diameter, and so on. There are also known materials of Y faujasite structure, and others. Many of these materials may be converted to the H or acid form, wherein a hydrogen occupies the cation site. For example, such a conversion may be had with many such materials by ion-exchange with an ammonium ion, followed by heating to drive off $NH_3$ or by controlled acid leaching. In general, the H form is more stable in materials having higher Si/Al rations, such as 2.5/1 and above.

One material of high activity is H mordenite. Mordenite is a material occurring naturally as the hydrated sodium salt corresponding to:

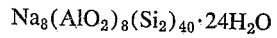

$$Na_8(AlO_2)_8(Si_2)_{40} \cdot 24H_2O$$

This mordenite material may be leached with dilute hydrochloric to arrive at an H or acid form. In a specific example, the mordenite material may be so treated as to have more than 50 percent in the acid form. A more complete discussion of H mordenite is found in co-pending application Ser. No. 142,778 filed Oct. 4, 1961 in the name of Vincent J. Frilette et al. (S4901).

Another type of high activity catalyst may be prepared by using Linde 13X molecular sieve, which is described in U.S. Patent 2,882,244. This material may be base exchanged with a solution of rare-earth chlorides (containing 4 percent of $RECl_3 \cdot 6H_2O$) at 180–200° F. to remove sodium ions from the aluminosilicate complex and replace at least some of them with the chemical equivalent of rare-earth ions. After washing free of soluble material and drying, there is produced an REX aluminosilicate containing 1.0–1.5 percent (wt.) of sodium and about 25 percent (wt.) of rare-earth ions calculated as $RE_2O_3$.

Materials incorporating both metal base exchange and an ammonia base exchange may be gotten by treating simultaneously or serially with metal salts and ammonia, followed by heating, to get metal-hydrogen forms of superactive material.

Similar preparations of high activity may be made by suitable preparation of a variety of crystalline aluminosilicates, such as Y faujasites, gmelinite, chabazite, and the like. For a fuller discussion of the nature of aluminosilicates and their method of preparation attention is also directed to U.S. Patent 3,033,778 to Frilette, and U.S. Patent 3,013,989 to Freeman.

According to the invention, the aluminosilicate catalysts may be varied within wide limits as to aluminosilicate employed, cation character and concentration, and added components in the pores thereof incorporated by precipitation, adsorption and the like. Particularly important variables are silica to alumina ratio, pore diameter and spatial arrangement of cations. The cations may be protons (acid) derived by base exchange with solutions of acids or ammonium salts, the ammonium ion decomposing on heating to leave a proton. Polyvalent metals may be supplied as cations, as such, or as spacing or stabilizing agents in acid aluminosilicates for stabilization. In addition to the rare-earth metals mentioned above, other suitable cations for exchange in the aluminosilicates include, for example, magnesium, calcium, manganese, cobalt, zinc, silver, and nickel.

The above discussed catalysts possess activities too great to be measured by the "Cat. A" test which is a standard evaluation test, widely established and used for the evaluation of hydrocarbon cracking catalysts, both for preliminary evaluation and for control during commercial use by examination of activity. In this test, a specified Light East Texas gas oil is cracked by passage over the catalyst in a fixed bed, at a liquid hourly space velocity (LHSV) of 1.0, using a catalyst-to-oil ratio (C/O) of 4/1, at an average reactor temperature of 875° F., and atmospheric pressure. The percentage of gasoline produced is the activity index (AI). The method of this test is described more fully in National Petroleum News, 36, page R–537 (Aug. 2, 1944). The control silica-alumina catalyst employed in the alpha rating test hereinafter more specifically described as an AI value of 46. To measure the activity of the instant superactive catalyst there has been developed a micro test method in which these catalysts are compared for relative cracking activity in the cracking of hexane with a conventional catalyst. This method and a fuller discussion of the development of the activity is fully disclosed in U.S. 3,250,728. As there explained, alpha is the measure of the comparative conversion ability of a particular superactive catalyst of the type above discussed when compared with a conventional silica-alumina cracking catalyst (90% $SiO_2$–10% $AlO_2$) having an activity index as measured by the Cat. A test of 46.

Many such superactive catalysts have been found to have an $\alpha$ value of the order of about 10,000 where $\alpha$ is the comparative activity of the catalyst based upon conventional amorphous silica-alumina cracking catalyst as $\alpha \approx 1$.

In order to use such catalysts with conventional equipment and processes now available, it is first necessary to modify the activity of such superactive catalysts.

One method for the adjustment of activity may be referred to as steam treating, or more shortly, steaming. It has been found that steaming can effect major degradation of the activity of the superactive catalysts utilized herein, and that controlled steaming can be utilized to acquire any desired degree of activity reduction. For example, a crystalline aluminosilicate of the 13X type which has been base-exchanged with a mixture of rare-earth chlorides has a relative activity $\alpha$, when freshly prepared of about 10,000. By controlled steaming in an atmosphere of steam for 5–40 hours, at 1300° F., its relative activity can be reduced to an $\alpha$ of about 10.

Another method of modifying such catalysts to reduce their activity is by dilution in a matrix of controlled activity or of little or no activity. Thus, a catalyst, such as RE 13X of $\alpha \approx$ 10,000 may be reduced readily to an activity useful in today's technology by incorporating in a matrix of amorphous silica-alumina; for example, to an overall activity of $\alpha \approx$ 0.5–2.0.

Thus, through combinations of the various methods of adjusting activity of the superactive catalytic materials any desired relative activity can be obtained. For example, the freshly prepared RE 13X of relative activity $\alpha \approx$ 10,000, which was reduced by steaming to a material of $\alpha \approx$ 10, can be further reduced by compounding with an equal amount of catalytically inert material to an activity, $\alpha \approx$ 5.

The dispersing of the superactive aluminosilicates in a matrix, e.g., clay or inorganic oxides, may often be carried out as just indicated to dilute the very high activity. Moreover, the formation of pellets or beads is very desirable from the point of view of resistance to attrition in the catalytic process. Generally spherical beads may be prepared by dispersing the aluminosilicate in an inorganic oxide sol according to the method described in U.S. Patent 2,900,399 and converted to a gelled bead according to the method described in U.S. Patent 2,384,946.

A very important characteristic of those superactive materials, and indeed of any catalytic material which undergoes repetitive cyclic processing and normal conditions of handling when in fabrication, or transit, and storage, is physical stability.

With those superactive materials, namely, crystalline aluminosilicates so treated as to have exchangeable hydrogen $H_e$, and superactivity, as measured by $\alpha$, it has been found that stability is dependent upon the atomic ratio Si/Al.

It has also been demonstrated that this atomic ratio Si/Al has considerable influence upon the degree of comparative activity $\alpha$.

One method for making high activity catalysts from crystalline aluminosilicates is, as has been noted, a method of ammonium ion exchange. Catalytic materials of $\alpha$ ranging upwards from 2 can be made by this method only when the Si/Al atomic ratio of the aluminosilicate starting material is at least about 1.8.

A further method, as has been noted, is exchange with mineral acid. Catalytic materials of very high activity, $\alpha$ can be made by this method when the Si/Al atomic ratio of the starting aluminosilicate is at least about 2.7 to 2.9.

It is quite evident that the above noted critical limits of Si/Al atomic ratio constitute distinct critical limits which are quite separate from any considerations of type of crystallinity, and override any considerations of specific crystal structure.

Furthermore, H form aluminosilicate materials having Si/Al atomic ratios in the range of 1.8 to 2.7 appear to be subject to some degree of physical instability when exposed to moisture. Consequently, the criticality of an atomic ratio of about 2.7 to about 2.9 becomes of importance when considering the conditions of use, storage, and transmit to which such materials may be exposed.

Inherent in this capability of resistance to moisture is the capability of use of superactive materials of Si/Al atomic ratio not less than about 2.7 to 2.9 in systems of reaction employing an aqueous medium, employing an aqueous reactant, or giving rise to an aqueous reaction product, for example, hydration, dehydration reactions.

The crystalline aluminosilicate material must have a pore size or intracrystalline aperture or channel size sufficiently great to admit desired reactants. 5 A. is approximately the minimum pore size so acceptable. It has been noted that materials based upon crystalline aluminosilicates having intersecting channel structures of the same or different sizes, preferentially of different sizes, are more effective than those of a simple structure. Whether or not this is based upon some factor of differential accessibility, "port plugging," or other factors are not clear.

Thus, according to the present invention, various types of catalytic chemical reactions may be conducted in the presence of these superactive catalysts wherein conditions are regulated so that a liquid phase is present which acts to assist the reaction or to act as a solvent or carrier for materials which may be deposited on, absorbed by, or associated with the catalyst, acting to reduce its activity. The liquid phase may be an unconverted reactant, a liquid product of reaction, or a liquid not concerned in the reaction which has been introduced for this purpose. This liquid phase in many reactions apparently acts to continuously wash away deactivating by-products, such as polymers, which form on the catalyst. The catalyst is thereby continuously washed to permit continuous or semi-continuous operation and the necessity for regeneration is reduced or even eliminated.

The superactive catalysts in accordance with this invention possess high concentrations of acid sites in intracrystalline spaces but accessible to the reactant molecules which are exceptionally stable to heat and chemicals. In accordance with the present invention, the liquid phase which acts as a solvent, carrier, or reaction assistant may also be preferentially adsorbed by the catalyst. Such strongly adsorbed molecules are non-polymerizable and act to presaturate the most active sites and thus optimize the catalyst selectivity. For example, in a chemical reaction involving liquid benzene and gaseous ethylene to make ethylbenzene, the benzene is adsorbed by the most active acid sites which might otherwise catalyze the polymerization of the ethylene reactant.

It is contemplated that the chemical reactions may be carrier out in the presence of a non-reactive material which is in the liquid phase at the reactive conditions, whereas the reactants may be in either liquid or vapor phase. Such materials may be any strongly adsorbed substances; for example, it could be a low percentage of a polycyclic material or basic nitrogen compound, etc. The process involves not only presaturation of the sites of the catalyst to give a large number of sites of controlled acidity, avoiding sites of highest activity; but also continuous addition of the strongly adsorbable molecules.

Many different types of catalytic reactions are contemplated by the present invention. Any reaction which is catalyzed by the superactive catalysts described heretofore is contemplated wherein the conditions are such that a liquid phase may be present to act as the solvent for the catalyst deposits or saturation of the highly active catalyst sites. Such catalytic reactions as disproportionation, aromatization, hydrogen transfer to saturate olefins, isomerization and alkylation are among the reactions which can be carried out according to the present invention.

When the same reaction was carrier out in the usual manner with gas phase conditions of operation without the liquid, the catalysts may be very rapidly deactivated; whereas using the principles of the present invention with the liquid phase present, the reaction can be almost continuously conducted with good selectivity without the necessity for reactivation of the catalyst.

The teachings of this invention are applicable to many and various instances of desired selective hydrogenation processing. Aside from platinum used as the active component within the zeolitic structures, other elements and complexes known to have hydrogenation activity may be used, such as other elements of the platinum or palladium group, transition group metals such as nickel, cobalt, and the like. Selective hydrogenation of either double-bond or aromatic bond units may be practiced selectively in a very large number of possible mixtures of organic molecules. In general, for selectivity among large cyclic or polycyclic molecules, the X-type faujasite will be most often useful, while for smaller molecular species to be hydrogenated, the A-type crystal may be more useful when combined with a hydrogenation component.

Following are examples of specific reactions which can be carried out in accordance with the present invention.

Example 1

One hundred and sixty grams of alpha-pinene was refluxed for five hours with six grams of an X faujasite which had been base exchanged with calcium. The products and unreacted pinene were then removed by steam distillation. Isomerization of the alpha-pinene was determined by infra-red analysis of the distillate. It was found that more than 90% of the pinene was converted to form various terpene isomers and polymers. Only 4% of the high molecular weight polymeric material was formed.

The liquid products acted to wash away impurities from the catalyst.

Example 2

O-xylene was isomerized and disproportionated by contact with a REX catalyst made by base exchanging an X faujasite with rare earth and ammonia, followed by heating to obtain a material which contained about 25% rare earth oxides calculated as $Re_2O_3$ which was then incorporated to the extent of about 5% in a silica-alumina matrix.

The contact of the O-xylene with the catalyst was conducted under vapor phase conditions at atmospheric pressure and a temperature of 450°F, at a xylene space velocity of 2.6 LHSV, and a hydrogen/xylen molar ratio of 10/1. Following are the results:

TABLE I.—VAPOR PHASE ISOMERIZATION OF O-XYLENE AT 450° F.

| Analysis, Percent Wt.: | Time on Stream, min. | | | | | |
|---|---|---|---|---|---|---|
| | 25 | 55 | 145 | 225 | 285 | 315 |
| Lights | | | 0.1 | | 0.1 | 0.1 |
| Toluene | 2.7 | 2.2 | 1.0 | 0.8 | 0.7 | 0.6 |
| M&P-xylene | 13.3 | 5.7 | 2.2 | 1.2 | 1.6 | 2.4 |
| O-xylene | 80.5 | 89.4 | 94.9 | 97.0 | 96.6 | 95.8 |
| Heavier than O-xylene | 3.5 | 2.7 | 1.8 | 1.0 | 1.0 | 1.1 |
| | 100.0 | 100.0 | 100.0 | 100.0 | 100.0 | 100.0 |
| Conversion, Percent Wt | 19.5 | 10.6 | 5.1 | 3.0 | 3.4 | 4.2 |

Example 3

O-xylene was isomerized and disproportionated by contact with the same catalyst as Example 2 under liquid phase conditions. The conditions of reaction were a temperature of 350° F., pressure of 400 p.s.i.g., and an O-xylene space velocity of 0.25 LHSV (upflow).

The results obtained after 750 minutes and after 1170 minutes on stream are summarized in Table II.

TABLE II.—LIQUID PHASE ISOMERIZATION-DISPROPORTIONATION OF O-XYLENE AT 350° F.

| | Charge Stock (Percolated Phillips O-xylene) | Product | |
|---|---|---|---|
| Time on Stream, min | | 750 | 1,170 |
| Analysis, Percent Wt.: | | | |
| Light | | 0.1 | 0.1 |
| Benzene | | 0.2 | 0.2 |
| Toluene | | 2.7 | 3.4 |
| M&P-xylene | | 23.2 | 27.4 |
| O-xylene | 99.7 | 70.6 | 65.3 |
| Trimethylbenzenes (1,3,5) | 0.3 | 0.4 | 0.3 |
| Trimethylbenzenes (1,2,4) | | 2.4 | 2.8 |
| Trimethylbenzenes (1,2,3) | | 0.1 | 0.1 |
| Heavier than Trimethylbenzenes | | 0.3 | 0.4 |
| | 100.0 | 100.0 | 100.0 |
| Conversion, Wt. Percent | | 29.1 | 34.4 |

Equilibrium at 350° F. (O-Xylene free Basis)

| Selectivity, Percent Wt.: | | | |
|---|---|---|---|
| Lights | | 0.3 | 0.3 |
| Benzene | 4.07 | 0.7 | 0.6 |
| Toluene | 22.45 | 9.3 | 9.9 |
| M&P-xylene | 37.20 | 79.8 | 79.7 |
| Trimethylbenzenes | 29.15 | 8.9 | 8.4 |
| Tetramethylbenzenes | 6.91 | 1.0 | 1.1 |
| Pentamethylbenzenes | 0.22 | | |
| | 100.0 | 100.0 | 100.0 |
| Ratio Isomerization/Disproportionation (wt.) | 0.59 | 3.95 | 3.93 |

A comparison of Table II and Table III will show the improved results obtained in accordance with the present invention as disclosed in Example 3 using the liquid phase conditions.

Example 4

Toluene was disproportionated in liquid phase over an REX catalyst similar to that described in Example 2. The conditions of reaction were a temperature of 450–525° F., pressure of 400 p.s.i.g., and a toluene space velocity of 0.5 LHSV.

The results obtained after 150 minutes and after 420 minutes on stream are summarized in Table III.

TABLE III.—SELECTIVITY IN THE LIQUID PHASE DISPROPORTIONATION OF TOLUENE AT 450-525° F.

|  | Charge (Si Gel Percolated Toluene) | Product at— | |
|---|---|---|---|
|  |  | 450° F. (150 min.) | 525° F. (420 min.) |
| Analysis, percent Wt.: |  |  |  |
| Lights | | 0.2 | 3.8 |
| Benzene | 0.2 | 3.8 | 10.6 |
| Toluene | 99.8 | 90.5 | 73.7 |
| M&P-xylene |  | 3.5 | 10.2 |
| O-xylene |  | 1.2 | 2.5 |
| Trimethylbenzenes |  | 0.8 | 2.7 |
| Heavier Than Trimethylbenzenes |  | 0.2 | 0.3 |
|  | 100.0 | 100.0 | 100.0 |
| Recovery, percent Wt | | 100 | 100 |
| Conversion, percent Wt | | 9.3 | 26.1 |

EQUILIBRIUM (TOLUENE-FREE BASIS)

|  | | 450° F. | 525° F. |
|---|---|---|---|
| Selectivity, percent Wt.: | | | |
| Lights | 45.9 | 45.7 | 38.7 | 39.8 |
| Benzene | 36.0 | 35.7 | 37.7 | 39.1 |
| M&P-xylene | 9.1 | 9.5 | 12.9 | 9.6 |
| O-xylene | 9.0 | 9.1 | 10.7 | 11.5 |
| Heavier Than Xylenes | | | | |
|  | 100.0 | 100.0 | 100.0 | 100.0 |

Example 5

Toluene was disproportionated in liquid phase in the presence of hydrogen over a mixture of 50% of a rare earth exchanged aluminosilicate as per Example 2 and 50% of a 0.6% wt. platinum on alumina catalyst. The conditions of reaction were a temperature of 300° F., a pressure of 400 p.s.i.g., a $H_2$/toluene ratio (molar) of 2.4, and an upflow toluene space velocity of 0.5 LHSV.

The results obtained after 60 minutes and after 300 minutes on stream are summarized in Table IV.

TABLE IV.—DISPROPORTIONATION OF TOLUENE IN PRESENCE OF HYDROGEN OVER PT DUAL-FUNCTIONAL CATALYST

| Time on Stream, minutes | 60 | 300 |
|---|---|---|
| Analysis, percent Wt.: |  |  |
|  | 0.3 | 0.2 |
| Lights | 0.6 | 0.6 |
| Methylcyclohexane | 23.9 | 28.2 |
| Toluene | 48.9 | 42.0 |
| Heavier than Toluene | 0.2 | 0.1 |
| Do | 0.2 | 0.2 |
| Do | 9.2 | 9.6 |
| Do | 16.7 | 18.8 |
| Do |  | 0.3 |
|  | 100.0 | 100.0 |

The above examples are merely representative of the type of catalytic reactions which can be conducted with a liquid phase present to continuously wash away the deactivating by-products from the catalyst. When utilizing conventional catalysts or gas-phases operation, very rapid deterioration of the catalyst occurred.

Although the present invention has been described in conjunction with preferred embodiments, it is to be understood that modifications and variations may be resorted to, without departing from the spirit and scope thereof, as those skilled in the art will readily understand. Such variations and modifications are considered to be within the purview and scope of the appended claims.

What is claimed is:

1. In a method for effecting catalytic conversion of alkyl aromatic hydrocarbons under conditions of isomerization and disproportionation in the presence of a crystalline aluminosilicate catalyst, the improvement which comprises carrying out said conversion in the liquid phase at a temperature of less than about 600° F. and thereafter recovering increased yields of desired product from said conversion.

2. Method according to claim 1 wherein the conversion is isomerization and the alkyl aromatic hydrocarbon is xylene.

3. The method according to claim 1 wherein the conversion is disproportionation and the alkyl aromatic hydrocarbon is toluene.

4. Method of claim 2 wherein the conversion is conducted at a temperature of less than about 400° F.

5. Method of claim 3 wherein the conversion is conducted at a temperature of less than about 525° F.

6. In a method for effecting catalytic conversion of alkyl benzenes under conditions of isomerization and disproportionation in the presence of a crystalline aluminosilicate catalyst having a pore size of at least about 5 Angstrom units and a silicon to aluminum ratio of at least about 1.8, the improvement which comprises carrying out said conversion in the liquid phase at a temperature of less than about 600° F. and thereafter recovering increased yields of desired product from said conversion.

7. Method of claim 6 wherein the aluminosilicate has been base exchanged with a cation selected from the group consisting of hydrogen ions, ammonium ions, rare earth ions, and mixtures thereof.

8. Method of claim 6 wherein the aluminosilicate has been base exchanged with a divalent metal cation.

9. Method of claim 8 wherein the conversion is isomerization and the alkyl benzene is xylene.

10. Method of claim 8 wherein the conversion is disproportionation and the alkyl benzene is toluene.

References Cited

UNITED STATES PATENTS

| 3,140,322 | 7/1964 | Frilette et al. | 260—682 |
| 3,182,095 | 5/1965 | Sullivan | 260—672 |
| 3,277,018 | 10/1966 | Plank et al. | 208—120 |
| 3,281,482 | 10/1966 | Dvoretsky et al. | 260—668 |
| 3,281,483 | 10/1966 | Benesi et al. | 260—672 |

SAMUEL P. JONES, *Primary Examiner.*